United States Patent
Melancon, Jr.

(10) Patent No.: US 9,884,575 B2
(45) Date of Patent: Feb. 6, 2018

(54) CONTAINER HAVING A SPRING-COUNTER-BALANCED RAMP WALL

(71) Applicant: Dennis W. Melancon, Jr., Lynchburg, VA (US)

(72) Inventor: Dennis W. Melancon, Jr., Lynchburg, VA (US)

(73) Assignee: Dropstor, Inc., Lynchburg, VA (US)

(*) Notice: Subject to any disclaimer, the term of this patent is extended or adjusted under 35 U.S.C. 154(b) by 0 days.

(21) Appl. No.: 15/164,284

(22) Filed: May 25, 2016

(65) Prior Publication Data

US 2017/0341559 A1 Nov. 30, 2017

(51) Int. Cl.
*B60P 1/43* (2006.01)
*B65F 3/26* (2006.01)
*B60P 1/64* (2006.01)

(52) U.S. Cl.
CPC ............. *B60P 1/435* (2013.01); *B60P 1/438* (2013.01); *B60P 1/6463* (2013.01); *B65F 3/26* (2013.01)

(58) Field of Classification Search
CPC ......... B60P 1/6418; B60P 1/438; B60P 1/435; B65D 90/008; B65D 90/086; B65D 88/542; B65G 69/28
USPC ........................................ 414/537, 556, 557
See application file for complete search history.

(56) References Cited

U.S. PATENT DOCUMENTS

| | | | | |
|---|---|---|---|---|
| 1,740,000 A | * | 12/1929 | Andrews | B65D 88/542 105/377.05 |
| 3,246,777 A | * | 4/1966 | Tabordon | B60P 1/4421 187/262 |
| 4,691,956 A | * | 9/1987 | Hodge | B60P 1/26 292/DIG. 29 |
| 4,836,736 A | | 6/1989 | Neagu | |
| 5,533,234 A | * | 7/1996 | Bizek | E05F 1/123 16/277 |
| 5,624,049 A | * | 4/1997 | Kovash | B65D 88/121 220/1.5 |
| 5,644,992 A | * | 7/1997 | Clive-Smith | B65D 88/129 108/53.1 |
| 5,755,472 A | * | 5/1998 | Clive-Smith | B65D 88/129 108/53.1 |
| 5,768,828 A | * | 6/1998 | Wilson | B60P 1/438 49/197 |

(Continued)

*Primary Examiner* — Kaitlin Joerger
(74) *Attorney, Agent, or Firm* — Laubscher, Spendlove & Laubscher, P.C.

(57) ABSTRACT

A container for transporting and storing landscaping materials includes a rectangular container body having a bottom wall, a pair of side walls, and an end wall which define an open-ended chamber; and a vertical ramp end wall that is pivotally displaceable between a normal vertical closed position, and a downwardly inclined loading position, which pivot arrangement includes a pair of horizontal pivot shafts arranged collinearly transversely of the container on opposite sides of the protruding ends of a pair of guide rails that extend longitudinally beneath the bottom wall. To afford manual operation of the massive ramp wall, a counter-balancing spring arrangement is provided including a pair of torsion springs mounted concentrically on these two pivot shafts for biasing the ramp wall from the loading position upwardly toward the closed position with an aggregate torque force that is generally equal to the weight of the ramp wall.

5 Claims, 4 Drawing Sheets

(56) References Cited

U.S. PATENT DOCUMENTS

| | | | |
|---|---|---|---|
| 5,937,583 A * | 8/1999 | Lamperti | E02D 29/1418 16/298 |
| 6,089,304 A | 7/2000 | Mullet et al. | |
| 6,269,963 B1 * | 8/2001 | Hall | B65D 88/121 220/1.5 |
| 6,354,788 B1 | 3/2002 | Adams | |
| 6,416,264 B2 * | 7/2002 | Heim | B65D 88/121 410/24 |
| 6,527,264 B2 | 3/2003 | Schroer | |
| 6,669,243 B2 | 12/2003 | Katoh et al. | |
| 6,736,051 B2 | 5/2004 | Frantz et al. | |
| 6,976,723 B2 * | 12/2005 | Libby | B60P 1/26 296/50 |
| 7,055,215 B1 | 6/2006 | Ligtenberg et al. | |
| 7,125,062 B2 | 10/2006 | Kiester et al. | |
| 7,213,860 B2 * | 5/2007 | Brenneman | B60J 5/108 296/146.8 |
| 7,261,356 B1 * | 8/2007 | Taylor | B60P 1/435 296/146.11 |
| 7,617,662 B2 | 11/2009 | Erdmann et al. | |
| 8,043,043 B2 * | 10/2011 | Collins | B60P 1/6454 414/469 |
| 8,061,954 B2 * | 11/2011 | Lambright | B60P 1/435 414/537 |
| 8,079,626 B2 * | 12/2011 | Estes | B65D 90/0033 220/1.5 |
| 8,091,942 B2 * | 1/2012 | Watts | B60P 1/435 296/61 |
| 8,109,552 B2 | 2/2012 | Nelson | |
| 8,348,325 B2 | 1/2013 | Hausler et al. | |
| 8,840,354 B2 * | 9/2014 | Melancon, Jr. | B65D 88/123 414/537 |
| 9,527,426 B2 * | 12/2016 | Lavmand | B60P 7/13 |
| 9,545,867 B2 * | 1/2017 | Melancon, Jr. | B60P 1/435 |
| 2004/0040477 A1 * | 3/2004 | Neumann | B65D 88/129 108/55.1 |
| 2004/0083671 A1 * | 5/2004 | Johnson | E04H 15/008 52/511 |
| 2005/0031437 A1 * | 2/2005 | Doose | B60P 1/6463 414/467 |
| 2007/0262107 A1 * | 11/2007 | Brenneman | B60J 5/108 224/495 |
| 2008/0201903 A1 * | 8/2008 | Sovis | E05F 1/1215 16/290 |
| 2008/0217949 A1 * | 9/2008 | Kobrehel | B60P 1/438 296/61 |
| 2009/0079217 A1 | 3/2009 | Bakshi et al. | |
| 2013/0101374 A1 * | 4/2013 | Melancon | B60P 1/6463 414/469 |
| 2014/0154035 A1 * | 6/2014 | Walker | B60P 1/435 414/537 |
| 2014/0271072 A1 * | 9/2014 | Friesen | B60P 1/438 414/537 |
| 2015/0069051 A1 | 3/2015 | Kraft | |

* cited by examiner

CONTAINER HAVING A SPRING-COUNTER-BALANCED RAMP WALL

REFERENCE TO RELATED APPLICATIONS

This application is related to the prior application of Dennis W. Melancon Ser. No. 14/672,209 filed Mar. 19 2015 entitled "Ramp Wall Operating Arrangement".

BACKGROUND OF THE INVENTION

Field of the Invention

A container for transporting and storing landscaping materials includes a rectangular container body having a bottom wall, two side walls, and an end wall that define an open-ended chamber; and a vertical ramp end wall that is pivotally displaceable between a normal vertical closed position closing the chamber, and a downwardly inclined loading position, which pivot arrangement includes a pair of horizontal pivot shafts arranged collinearly transversely of the container on opposite sides of the protruding ends of a pair of guide rails that extend longitudinally beneath the bottom wall. To afford manual operation of the massive ramp wall, a counter-balancing spring arrangement is provided including a pair of torsion springs mounted concentrically on the pivot shafts for biasing the ramp wall from the loading position upwardly toward the closed position with a balanced torque force that is generally equal to the weight of the ramp wall.

Description of Related Art

In the inventor's prior Melancon U.S. Pat. No. 9,067,524, a rectangular container or bin is disclosed for transporting and storing landscaping materials and the like, including a ramp end wall that is pivotally displaceable by hydraulic motor means between its normal vertical closed position closing the container open end, and a lowered slightly downwardly inclined loading position, whereby a front end loading vehicle may be driven into and out of the container. As disclosed in this patent and in the companion Melancon et al U.S. Pat. No. 8,840,454, a bar or hook arrangement is provided on the container for connection with a motor-driven loading cable, thereby to assist in the loading and unloading of the container relative to a flatbed transporting vehicle. In the pending Melancon application Ser. No. 14/672,209 filed Mar. 19, 2015, it was proposed to connect the hydraulic motor means between the ramp wall and the ends of the centrally arranged guide rails that protrude from the forward end of the storage bin.

It is also known in the patented prior art to provide spring counter-balancing arrangements for biasing a pivotally connected wall toward a closed position, as indicated by the patents to Tabordon U.S. Pat. No. 3,246,777, Neagu U.S. Pat. No. 4,836,736, Adams U.S. Pat. No. 6,354,788, and Erdmann et al U.S. Pat. No. 7,617,661.

In an effort to reduce the number of moving parts, manufacturing costs, and maintenance expense, and to simplify operation in the field, the present invention was developed wherein the hydraulic ramp wall operating means is replaced by a counter-balancing spring arrangement, thereby to permit a single operator to manually displace the relatively massive ramp wall between its normal vertical closed position and the pivotally downwardly inclined loading position. Major concerns in developing the invention were how to properly mount the counter-balancing spring means on the container without interfering with the structural integrity of the container, or adversely affecting the loading and unloading of the container relative to a flatbed transporting vehicle, while affording manual operation of the massive ramp wall between its closed and open positions.

SUMMARY OF THE INVENTION

Accordingly, a primary object of the present invention is to provide a container for transporting and storing landscaping materials and the like, including a container body having an open-ended chamber that is normally closed by a vertical ramp wall that is pivotally displaceable to a downwardly inclined generally horizontal loading position, including a counter-balancing spring arrangement that biases the ramp wall from the downwardly inclined loading position upwardly toward the vertical closed position with a torque force that is generally equal to the gravitational torque force generated by the weight of the ramp wall, thereby to permit manual operation of the ramp wall between the closed and loading positions.

According to a more specific object of the invention, the counter-balancing torsion spring arrangement includes a pair of helical torsion spring that are concentrically mounted on two collinearly arranged pivot shafts that support the ramp wall for pivotal displacement between the closed and loading positions, which springs have tangentially outwardly extending end portions that react between the container bottom wall and the ramp wall, respectively. The pivot shafts are collinearly arranged on opposite sides of the end portions of the longitudinal container guide rails that extend outwardly beyond the adjacent edge of the container bottom wall for supporting the transport hook arrangement.

According to another object, a locking arrangement is provided for locking the counter-balanced ramp wall in the vertical closed position.

BRIEF DESCRIPTION OF THE DRAWINGS

Other objects and advantages of the invention will become apparent from a study of the following specification, when viewed in the light of the accompanying drawing, in which.

DETAILED DESCRIPTION OF THE INVENTION

Figure 1:
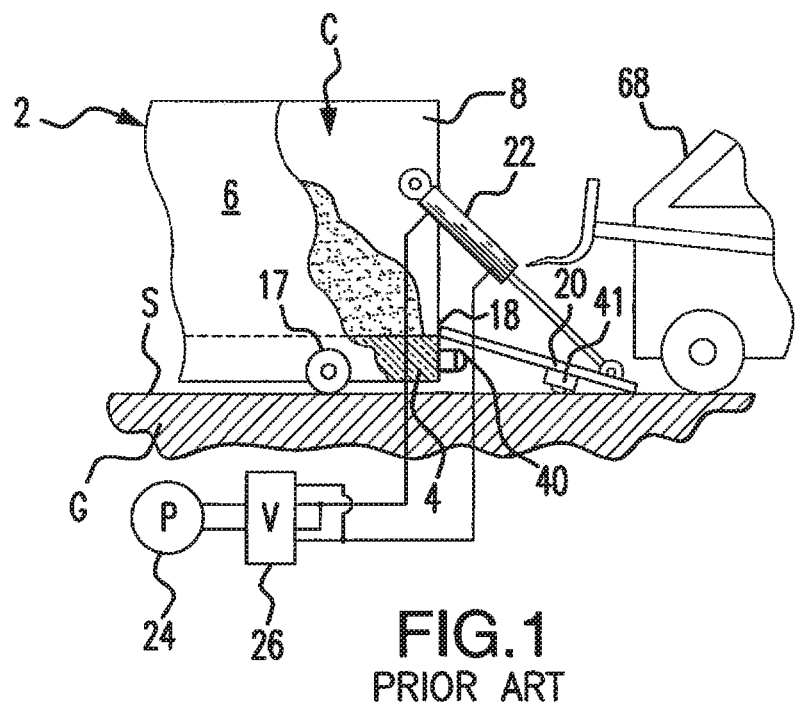
FIG. 1 is side elevation view of a basic landscaping container of the prior art including a ramp wall that is operated by a hydraulic motor arrangement.

Referring first more particularly to FIG. 1, it is known in the prior art, as shown by the Melancon U.S. Pat. No.

9,067,524, to provide a rectangular container 2 having a horizontal bottom wall 4, a pair of side walls 6, 8 and a fixed end wall (not shown) that cooperate to define an open-ended chamber C for receiving landscaping materials, such a mulch, crushed stone, soil, sand and the like. A ramp end wall 20 is pivotally connected with the container by pivot means 18, which ramp wall 20 is pivotally displaceable by an hydraulic motor arrangement 22, 24 and 26 between the illustrated generally-horizontal loading position, and a normal vertical position closing the end of the chamber C. When the ramp wall is in the illustrated loading position, a front end loader vehicle 68 may be driven up the ramp wall to engage the landscaping material to remove the same from the container chamber C. In the illustrated embodiment of FIG. 1, transport bars 40 and 41 are provided for engagement by the hook of the motor-driven loading cable of a flatbed transport vehicle (not shown). Support wheels 17 may be provided on the container for engagement with the surface S of the ground G, thereby to assist in the transport of the container. As shown by the companion Melancon et al U.S. Pat. No. 8,840,354, a hook arrangement may be substituted for the transport bars 40 and 41 of FIG. 1.

Figure 2:
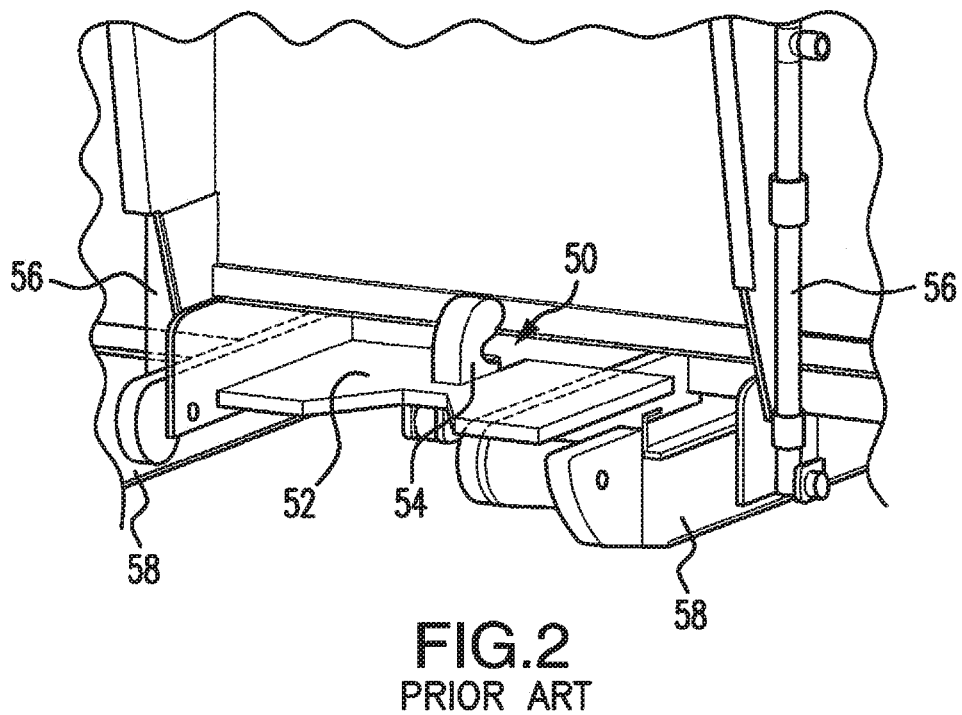
FIG. 2 is a detailed perspective view illustrating the transporting hook arrangement and the hydraulic motor arrangement of a prior embodiment of the invention.

Referring now to FIG. 2, in the companion Melancon et al U.S. Pat. No. 8,840,354, a retractable hook arrangement 50 including mounting plate 52 and a pivotal hook 54 is mounted on the protruding end portions of the longitudinal guide rails 58, which hook is adapted for connection with the loading cable of a flatbed transport vehicle. In the pending Melancon application Ser. No. 14/672,209 filed Mar. 19, 2015, the hydraulic piston and cylinder motors 56 that pivot the ramp wall 54 between its vertical closed and downwardly inclined loading positions are connected between the ramp wall 54 and the protruding ends of the longitudinal guide rails 58, respectively.

Figure 3A:
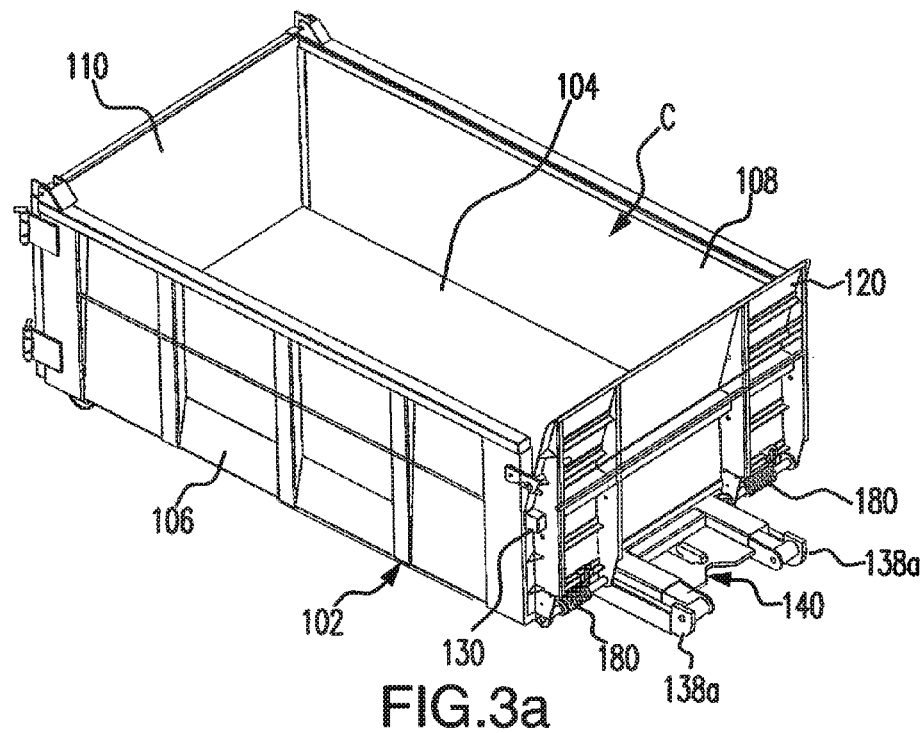
FIGS. 3a and 3b are top and bottom perspective views, respectively, of the container of the present invention.
Figure 3B:
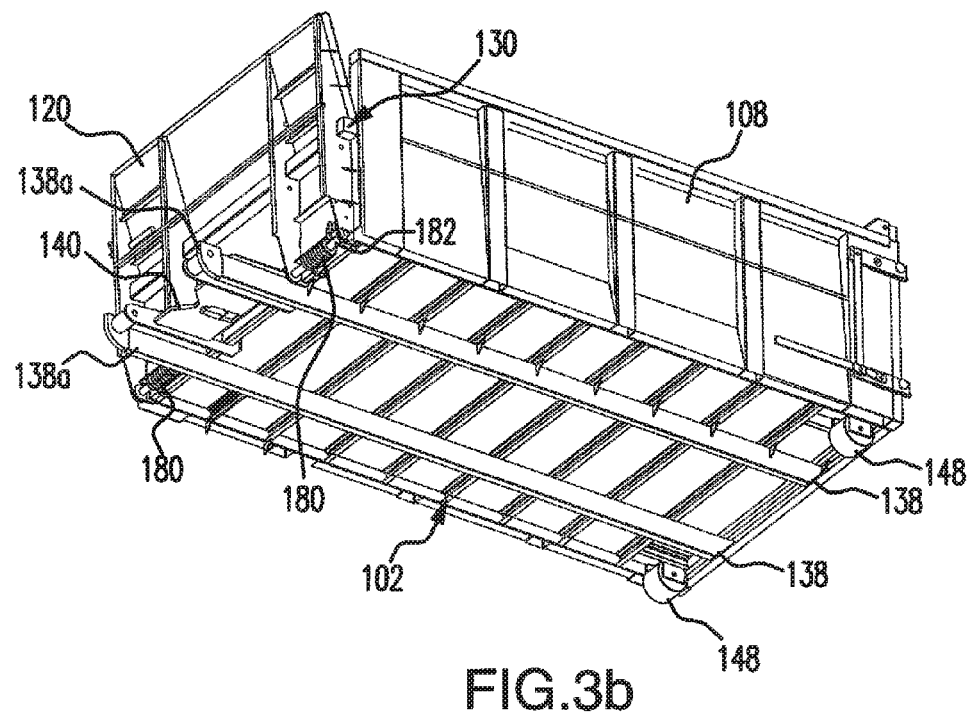

Referring FIGS. 3a and 3b, in accordance with the present invention, the hydraulic motor arrangements of the prior art for operating the approximately 500-pound ramp end wall 120 is replaced by a counter-balancing torsion spring arrangement including a pair of helical torsion springs 180. These torsion springs react between the container body 102 and the ramp end wall 120, thereby to apply to the ramp wall an upwardly-directed counter-balancing torque force that is opposite and generally equal to (or slightly greater than) the gravitational torque force that biases the ramp wall downwardly toward the generally horizontal loading position. As a consequence of this counter-balancing spring arrangement, a single operator may easily manually displace the ramp wall between its generally horizontal loading position and the vertical closed position. Locking arrangement 130 (FIGS. 3a and 8) serve to lock the ramp end wall 120 in its normal vertical closed position.

The rectangular container body 102 includes a horizontal bottom wall 104, a pair of vertical side walls 106 and 108, and a fixed vertical end wall 110 that cooperate to define an open-topped chamber C. It also includes a pair of parallel spaced guide rails 138 that extend longitudinally centrally beneath the entire length of the container bottom wall for guiding the container as it is loaded and unloaded from a flatbed transport vehicle. Two transport rollers 148 are provided at the rear end of the lower surface of the bottom wall. A transport hook arrangement 140 is mounted on the end portions 138a of the guide rails 138 that protrude outwardly beyond the adjacent edge of the container bottom wall.

Figure 4:
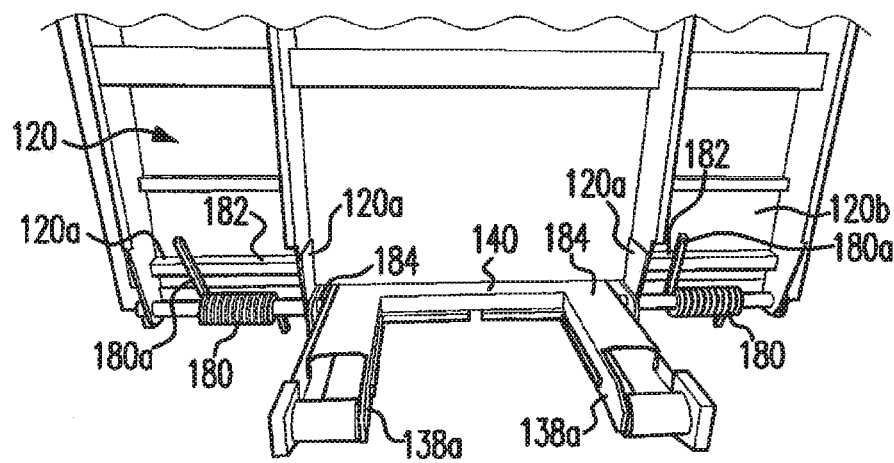
FIG. 4 is a detailed front perspective view illustrating the counter-balancing torsion spring arrangement of FIG. 2.
Figure 5:
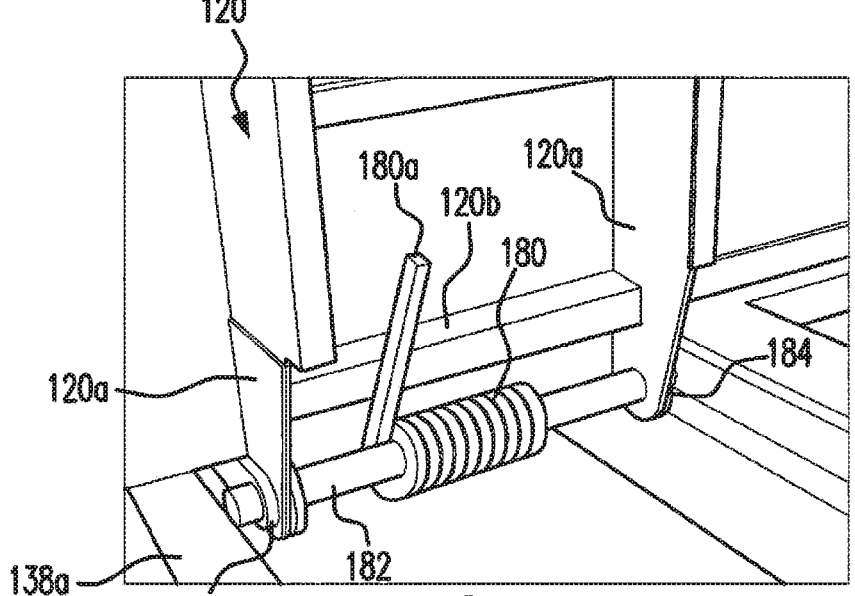
FIGS. 5 and 6 are detailed perspective views illustrating the tangentially-extending end portions provided at opposite ends of each helical torsion spring, respectively.
Figure 6:
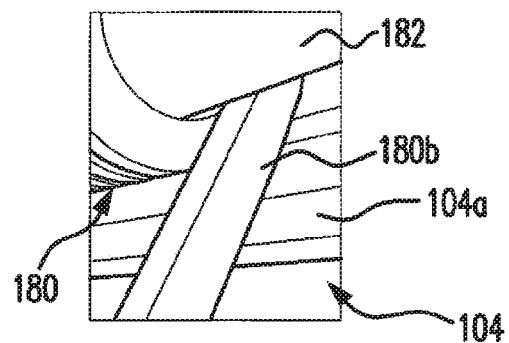
Figure 7:
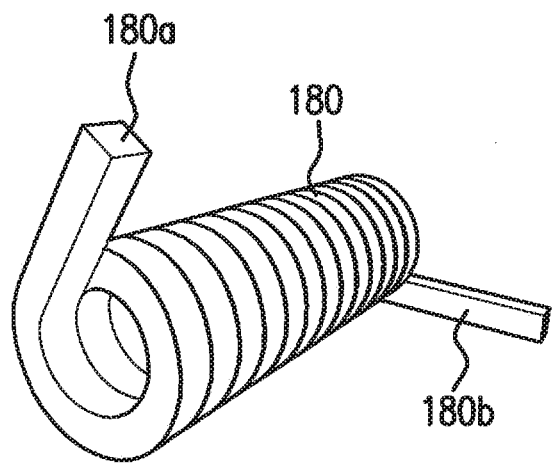
FIG. 7 is a perspective view of one of the counter-balancing torsion springs of the apparatus of FIGS. 3a and 3b.

Referring now to FIGS. 4-6, a pair of collinearly arranged pivot shafts 182 are arranged on opposite sides of the guide rails 138, the ends of the pivot shafts being supported by support bars 184 that are secured to the forward end of the container bottom wall 104. The ramp wall 120 has two pairs of parallel spaced downwardly extending pivot arms 120a that are journaled on the two pivot shafts 182, thereby to permit pivotal displacement of the ramp wall between its vertical closed position shown in FIGS. 3a and 3b, and its generally horizontal loading position (corresponding to FIG. 1). To counter-balance the weight of the ramp wall 120, two helical torsion springs 180 are mounted concentrically on the pivot shafts 182 between the associated pivot arms 120a. Each torsion spring 180 has a first end portion 180a that extends tangentially outwardly toward engagement with a horizontal bar portion 120b of the ramp wall 120 (as shown in FIG. 5), and a second end portion 180b that extends tangentially outwardly toward engagement with a horizontal bar portion 104a of the container bottom wall 104 (as shown in FIG. 6).

Figure 8:
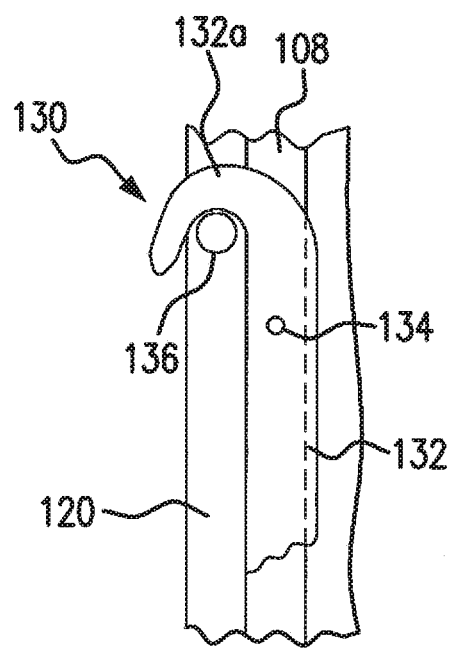
FIG. 8 is a detailed elevational view of one embodiment of the ramp wall locking means of FIG. 3b.

In the locking arrangement shown in FIG. 8, the locking lever 132 is pivotally connected by pivot pin 135 with the side wall 108, which locking lever has a cam portion 132 that is adapted to come into locking engagement with a locking pin 136 that is secured to the ramp wall 120. To unlock the ramp wall, the locking lever is pivoted in the clockwise direction about pivot pin 134, thereby to release the locking cam 132a from the locking pin 136. A locking arrangement 130 may be provided at each side of the ramp end wall. Various other locking arrangements may be used to lock the ramp wall 120 to the container side walls 106 and 108.

Operation

Assume that the container 102 has been transported to a desired location, and unloaded from the transporting flatbed trailer. The locking lever 138 is pivoted in the clockwise direction to unlock the locking means 130, and the operator manually initiates downward pivotal movement of the ramp wall 120. This results in tensioning of the torsion coil 180 owing to the relative displacement of the coil ends 180a and 180b. The ramp wall 120 is continuously displaced downwardly toward the generally- horizontal downwardly-inclined loading position, with the aggregate tension of the two torsion springs 180 serving to counter-balance the gravitational torque force produced by the weight of the ramp wall 120. The front end loader may then be driven up the ramp wall 120 and into the container chamber C for the discharge of the landscaping materials therefrom.

When the delivery of the desired amount of material from the container has been completed, the operator manually raises the counter-balanced ramp wall 120 toward the vertical closed position, and then operates the locking means 130 to lock the ramp end wall to the container body 102. The front end loading vehicle may or may not be contained in the chamber, as desired.

In this invention, the use of standard helical torsion springs is contemplated, for example, a Chamberlain 0.75 wire heavy duty helical torsion spring produced by McAllister Industries of Surrey, British Columbia, Canada. The spring arrangement results in a cost savings, a reduction of moving parts, simple manual operability, and a maintenance-free installation. This is achieved without any compromise of the structural integrity and durability of the container. Consequently, owing to the counterbalancing spring arrangement provided by the instant invention, the massive ramp end wall (which might weigh on the order of 500 pounds), is easily pivotally displaced manually by a single operator toward its open or closed positions. By using two springs collinearly arranged on opposite sides of the protruding guide rail ends, the biasing forces are balanced and produce no adverse effect on the pivoting operation of the ramp wall.

Although the use of two pivot shafts has been disclosed, it is possible that a single pivot shaft and a single concentrically-mounted torsion spring could be provided. It is also conceivable that other types of spring arrangements, such as tension and/or compression spring arrangements, could be used to counter-balance the weight of the ramp wall.

While in accordance with the provisions of the Patent Statutes the preferred forms and embodiments of the invention have been illustrated and described, it will be apparent to those skilled in the art that changes may be made without deviating from the invention described above.

What is claimed is:

1. A container for tranporting and storing bulk materials, comprising:
   (a) a rectangular container body having:
      (1) a horizontal bottom wall;
      (2) a pair of parallel vertical side walls and a vertical rear end wall integrally connected with said bottom wall to define a chamber that is open at one end:
      (3) a vertical ramp forward end wall;
      (4) a pivot assembly connecting the bottom edge portion of said ramp wall with said container body for pivotal movement of said ramp wall between a normal vertical closed position closing the open end of said chamber, and a downwardly inclined loading position at which a front-loading vehicle may be driven into and out of the container body chamber, wherein said pivot assembly includes:
         (1) a pair of collinearhorizontal pivot shafts extending transversely of said container;
         (2) support means supporting said pivot shafts in parallel spaced relation relative to said bottom wall forward end; and
         (3) two pairs of parallel spaced pivot arms integral with and extending downwardly from the bottom edge portion of said ramp end wall when said ramp end wall is in said closed vertical position, the lower ends of said pairs of pivot arms being journaled on said pivot shafts, respectively; and
      (5) a pair of parallel spaced guide rails rigidly secured to, and extending centrally longitudinally below the length of, said bottom wall, said guide rails having end portions that extend outwardly beyond said vertical ramp wall and the forward end of said bottom wall, wherein said pivot shafts are on opposite sides of said guide rails; and
   (b) a counter-balancing spring assembly including helical torsion springs arranged concentrically about said collinear horizontal pivot shafts for biasing said ramp wall from said downwardly inclined loading position upwardly toward said vertical closed position with a torque force that is generally equal to the gravitational torque force generated by the weight of said ramp wall, thereby to permit manual operation of said ramp wall between said closed and loading positions.

2. The container as defined in claim 1, wherein each of said torsion springs has a first tangentially outwardly extending end portion that reacts with said container body bottom wall, and a second tangentially outwardly extending end portion that reacts with said ramp end wall.

3. The container as defined in claim 2, and further including:
   a transport hook mounted on said guide rail extending rail portions.

4. The container as defined in claim 3, and further including:
   a locking assembly for locking said ramp end wall to said container body when said ramp wall is in said vertical closed position.

5. A container for transporting and storing bulk materials, comprising:
   (a) a rectangular container body having:
      (1) a horizontal bottom wall;
      (2) a pair of parallel vertical side walls and a vertical rear end wall integrally connected with said bottom wall to define a chamber that is open at one end:
      (3) a vertical ramp forward end wall;
      (4) a pair of parallel spaced guide rads rigidly secured to, and extending centrally longitudinally below the length of, said bottom wall, said guide rails having end portions that extend outwardly beyond said vertical ramp wall and the forward end of said bottom wall; and
      (5) a pivot assembly connecting the bottom edge portion of said ramp wall with said container body for pivotal movement of said ramp wall between a normal vertical closed position closing the open end of said chamber, and a downwardly inclined loading position at which a front-loading vehicle may be driven into and out of the container body chamber, said pivot arrangement including:
         (1) a pair of collinear horizontal pivot shafts extending transversely of said container on opposite sides of said guide rails;
         (2) support means supporting said pivot shafts in parallel spaced relation relative to said bottom wall forward end; and
         (3) two pairs of parallel spaced pivot arms integral with and extending downwardly from the bottom edge portion of said ramp end wall when said ramp end wall is in said closed vertical position, the lower ends of said pairs of pivot arms being journaled on said pivot shafts, respectively;
   (b) a transport hook mounted on said guide rail extending rail portions;
   (c) a counter-balancing spring assembly biasing said ramp wall from said horizontal loading position upwardly toward said closed vertical position with a torque force that is generally equal to the gravitational torque force generated by the weight of said ramp wall, thereby to permit manual operation of said ramp wall between said closed and loading positions, said spring assembly includes a pair of helical torsion springs mounted concentrically on said pivot shafts, respectively; and
   (d) a locking assembly for locking said ramp end wall to said container body when said ramp wall is in said vertical closed position.

* * * * *